(12) United States Patent
Forrest, III et al.

(10) Patent No.: US 8,904,048 B2
(45) Date of Patent: Dec. 2, 2014

(54) BIDI EXTENSION FOR CONNECTED DEVICES

(75) Inventors: Herman Richard Forrest, III, Redmond, WA (US); Michael P. Fenelon, Bothell, WA (US); Guillermo Eduardo Guillen, Redmond, WA (US); Frank Gorgenyi, Bremerton, WA (US); Justin Hutchings, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 157 days.

(21) Appl. No.: 13/228,292

(22) Filed: Sep. 8, 2011

(65) Prior Publication Data

US 2013/0067120 A1    Mar. 14, 2013

(51) Int. Cl.
*G06F 3/00* (2006.01)
*G06F 13/12* (2006.01)
*G06F 13/38* (2006.01)

(52) U.S. Cl.
CPC .................................. *G06F 13/387* (2013.01)
USPC .................................. 710/8; 710/10; 710/62

(58) Field of Classification Search
None
See application file for complete search history.

(56) References Cited

U.S. PATENT DOCUMENTS

| | | | |
|---|---|---|---|
| 5,604,843 | A | 2/1997 | Shaw et al. |
| 5,768,583 | A | 6/1998 | Orzol et al. |
| 5,926,775 | A | 7/1999 | Brumley et al. |
| 6,094,221 | A | 7/2000 | Andersion |
| 6,538,763 | B1 | 3/2003 | Klosterman et al. |
| 6,549,221 | B1 | 4/2003 | Brown et al. |
| 6,825,941 | B1 | 11/2004 | Nguyen et al. |
| 7,127,678 | B2 | 10/2006 | Bhesania et al. |
| 7,284,246 | B2 | 10/2007 | Kemp et al. |
| 7,296,187 | B1 | 11/2007 | Fritz et al. |

(Continued)

FOREIGN PATENT DOCUMENTS

| | | |
|---|---|---|
| CN | 1453696 | 11/2003 |
| CN | 1624648 | 6/2005 |
| CN | 101657790 | 2/2010 |
| CN | 101727340 | 6/2010 |

OTHER PUBLICATIONS

"Non-Final Office Action", U.S. Appl. No. 12/966,840, (Mar. 18, 2013), 13 pages.

(Continued)

*Primary Examiner* — Idriss N Alrobaye
*Assistant Examiner* — David Martinez
(74) *Attorney, Agent, or Firm* — Timothy Churna; Kate Drakos; Micky Minhas

(57) ABSTRACT

Bidirectional (bidi) extension techniques for USB and/or other similar busses/connections are described in which an interface is provided to enable bidirectional communication with connected devices. The interface may be implemented as an operating system component to handle bidi communication for devices from multiple different independent hardware vendors (IHVs). Device drivers for different devices can be configured to include extension files in accordance with an established schema for bidi communication. The extension files describe supported bidi attributes, capabilities of the device, and how to make calls into the device. The interface operates to detect the extension files and set-up a corresponding device for bidi communication. Applications then interact through the interface to access, retrieve, and set configuration and status data for connected devices. The use of extension files enable creation of architecture independent devices drivers that can be used across different platforms with substantially no changes.

20 Claims, 8 Drawing Sheets

(56) References Cited

U.S. PATENT DOCUMENTS

| | | | |
|---|---|---|---|
| 7,493,327 | B1 | 2/2009 | Fenelon |
| 7,505,170 | B2 | 3/2009 | Emerson et al. |
| 7,522,299 | B2 | 4/2009 | Nguyen et al. |
| 7,940,407 | B2 | 5/2011 | Suzuki et al. |
| 8,365,164 | B1 | 1/2013 | Morgenstern |
| 8,396,409 | B2 | 3/2013 | Azami et al. |
| 8,493,600 | B2 | 7/2013 | Hutchings et al. |
| 2002/0054313 | A1 | 5/2002 | Shimizu |
| 2002/0067504 | A1 | 6/2002 | Salgado |
| 2002/0078200 | A1 | 6/2002 | Helms |
| 2003/0093581 | A1 | 5/2003 | Oliver et al. |
| 2003/0103224 | A1 | 6/2003 | Johnson et al. |
| 2003/0200289 | A1 | 10/2003 | Kemp et al. |
| 2004/0193745 | A1 | 9/2004 | Olbricht |
| 2005/0028172 | A1 | 2/2005 | Yoshikawa et al. |
| 2005/0108728 | A1* | 5/2005 | Camara et al. ............ 719/321 |
| 2006/0017948 | A1 | 1/2006 | Levin et al. |
| 2006/0106775 | A1 | 5/2006 | Kuhn et al. |
| 2006/0146353 | A1 | 7/2006 | Yue et al. |
| 2006/0244986 | A1 | 11/2006 | Ferlitsch |
| 2007/0013930 | A1 | 1/2007 | Emerson et al. |
| 2007/0027979 | A1 | 2/2007 | Emerson et al. |
| 2007/0067499 | A1 | 3/2007 | Wolfe et al. |
| 2007/0127069 | A1 | 6/2007 | Steele et al. |
| 2008/0055640 | A1 | 3/2008 | Takahashi et al. |
| 2008/0123130 | A1 | 5/2008 | Matsumoto et al. |
| 2008/0180723 | A1 | 7/2008 | Selvaraj |
| 2008/0250430 | A1 | 10/2008 | Salgado et al. |
| 2008/0291483 | A1 | 11/2008 | Shimatani |
| 2009/0063563 | A1 | 3/2009 | Khangaonkar et al. |
| 2009/0128849 | A1 | 5/2009 | Sakura |
| 2009/0190150 | A1 | 7/2009 | Selvaraj et al. |
| 2009/0213395 | A1 | 8/2009 | Ozaki |
| 2009/0251730 | A1 | 10/2009 | Yamaguchi |
| 2009/0257080 | A1 | 10/2009 | Herrmann et al. |
| 2010/0073724 | A1 | 3/2010 | Kurata |
| 2010/0188680 | A1 | 7/2010 | Xiao |
| 2011/0010470 | A1 | 1/2011 | Hulbert et al. |
| 2012/0147414 | A1 | 6/2012 | Hutchings et al. |
| 2012/0147415 | A1 | 6/2012 | Hutchings et al. |
| 2012/0147416 | A1 | 6/2012 | Hutchings et al. |
| 2013/0067120 | A1* | 3/2013 | Forrest et al. ............ 710/19 |

OTHER PUBLICATIONS

"Notice of Allowance", U.S. Appl. No. 12/968,051, (Mar. 21, 2013), 9 pages.

"Advances in High-Speed Parallel Port Performance and Port Sharing", *IEEE 1284.3 and 1284.4, Warp Nine Engineering*, retrieved from <http://www.fapo.com/1284adv.htm> on Sep. 10, 2010, (Aug. 16, 2008), 2 pages.

"Networking Solutions", *EPSON UK Ltd.*, retrieved from <http://www.business-solutions.epson.co.uk/Networking%20 Solutions_Management.html> on Sep. 10, 2010, (Feb. 23, 2006), 3 pages.

"Printing Overview", *MSDN, .NET Framework 4—Windows Presentation Foundation*, retrieved from <http:msdn.microsoft.com/en-us/library/ms742418(printer).aspx> on Sep. 7, 2010, 9 pages.

"Supporting Advanced Color in Print Drivers", available at <http://download.microsoft.com/download/a/f/7/af7777e5-7dcd-4800-8a0a-b18336565f5b/color-drv.docx>, (Dec. 17, 2007), 12 pages.

RKTBOY, "Launching a script when a specific USB device is connected", Retrieved at <<http://www.autohotkey.com/forum/topic53493.html>>, Jan. 18, 2010, pp. 9.

"International Search Report and Written Opinion", Application No. PCT/US2011/064751, (Sep. 17, 2012), 8 pages.

"Final Office Action", U.S. Appl. No. 12/966,840, (Oct. 4, 2013), 13 pages.

"Non-Final Office Action", U.S. Appl. No. 12/966,841, (Sep. 26, 2013), 13 pages.

"Foreign Office Action", CN Application No. 201110414199.9, Jan. 10, 2014, 13 pages.

"Foreign Office Action", CN Application No. 201110414191.2, Feb. 8, 2014, 14 pages.

"Non-Final Office Action", U.S. Appl. No. 12/966,841, Mar. 31, 2014, 14 pages.

"Non-Final Office Action", Application No. 12/966,840, 03/31/14, 8 pages.

"Foreign Office Action", CN Application No. 201110414191.2, Sep. 3, 2014, 6 pages.

"Foreign Office Action", CN Application No. 201110414199.9, Aug. 13, 2014, 17 pages.

"Foreign Office Action", CN Application No. 201110417183.3, Aug. 20, 2014, 7 pages.

"Notice of Allowance", U.S. Appl. No. 12/966,840, Jul. 7, 2014, 5 pages.

\* cited by examiner

BIDI EXTENSION FOR CONNECTED DEVICES

BACKGROUND

Universal Serial Bus (USB) is one way in which users may connect devices to their computers. For USB connected devices, a standard way does not exist to define, retrieve or provide rich device status and configuration information over a USB connection. As a result, hardware developers are forced to create custom device-specific software, such as port monitors and language monitors, designed to handle communication of status and configuration for devices on an individual basis. Such device-specific software is traditionally developed using complex binary coding. Moreover, duplicate efforts are performed by different hardware developers to create their own custom solutions. As such, use of many different custom solutions may increase development costs, cause driver reliability issues, and contribute to instability of a computing platform.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Bidirectional (bidi) extension techniques for USB and/or similar busses/protocols are described in which an interface is provided to enable bidirectional communication with connected devices. The interface may be configured as a bidi extender that is incorporated as an operating system component. The bidi extender is designed to support bidi communications between a computing device and connected devices of multiple different independent hardware vendors (IHVs). The bidi extender implements an architecture independent extension schema to access and define status and configuration data for connected devices. In one approach, the bidi extender detects extension files included with a device driver in accordance with the schema and employs the files to initialize the device for bidirectional communication. In at least some embodiments, the bidi extender supports extension files defined using script-based programming languages such as JavaScript and/or extensible mark-up language (XML). Applications may then invoke the bidi extender to request data for a device, set values for device specific data and/or register to receive change notifications regarding the data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Bidirectional (bidi) extension techniques are described in which an interface is provided to enable bidirectional communication with connected devices. For example, a USB bidi extender may be provided as a component of a print subsystem to handle bidi communication for USB printers from multiple different independent hardware vendors (IHVs). Bidi communication can be used to obtain/set supported bidi values for configuration and status data, which in the case of printers may include items such as ink levels, print job status, paper tray types, printer functions, and so forth. Printer drivers for the printers can be configured to include one or more extension files in accordance with an established extension schema for USB bidi communication. The extension files describe supported bidi values, actions, and/or queries, capabilities of the device, and how to make calls into the device to manipulate data. The USB bidi extender operates to detect the extension files and set-up a corresponding device for bidi communication according to the extension files. Applications may then interact through the USB bidi extender to access, retrieve, and set configuration and status data for the USB connected devices.

Although examples of USB connected devices are provided throughout this document, the bidi extension techniques are not limited to USB or USB connected devices. Rather, the techniques are equally applicable to similar busses, connections, and devices that make use of various send/receive protocols to connect and communicate with peripheral devices from IHVs, such as transmission control protocol (TCP), direct serial connections, and/or wireless technologies such as Bluetooth®. Thus, a bidi extender may also be configured and provided for other similar types of busses, connections, and devices, that operates in a comparable manner to the USB bidi extender(s) for USB devices discussed by way of example herein.

In the discussion that follows, a section titled "Operating Environment" is provided and describes an example environment in which one or more embodiments can be employed. Next, a section titled "Example USB Bidi Extension Techniques" describes example details and procedures for bidi extension in accordance with one or more embodiments. Last, a section titled "Example System" describes an example system that can be utilized to implement one or more embodiments.

Operating Environment

Figure 1:
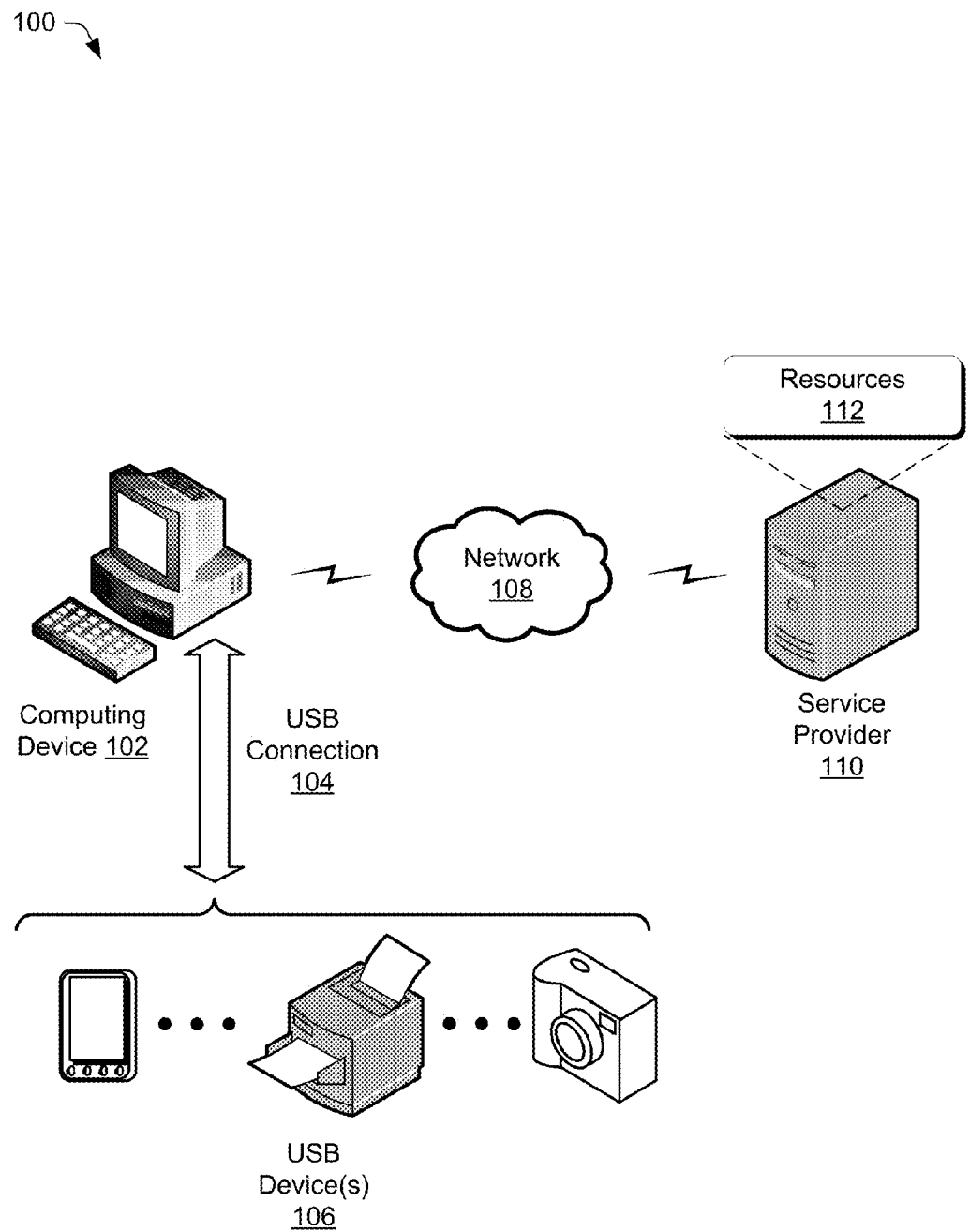
FIG. 1 is an illustration of an environment in an example implementation in accordance with one or more embodiments.

FIG. 1 illustrates an operating environment in accordance with one or more embodiments, generally at 100. The environment 100 includes a computing device 102 that is connected by a universal serial bus (USB) connection 104 to one or more USB devices 106. Examples of USB devices 106 include printers, cameras, and multi-media devices as illustrated, as well other types of devices typically connected to a computing device 102 over a USB connection 104. The USB devices 106 generally represent devices connected locally to the computing device 102 by USB as illustrated or using other comparable send/receive protocols, connections, and/or technologies. The computing device 102 can be embodied as any suitable computing device such as, by way of example and not limitation, a desktop computer, a portable computer, a tablet computer, a handheld computer such as a personal digital assistant (PDA), cell phone, and the like. One example of a computing system that may represent various systems and/or devices including the computing device 102 is shown and described below in FIG. 8.

The computing device 102 can also be connected over a network 108 to a service provider 110 to access and interact with various resources 112. The resources 112 can include any suitable combination of services and/or content typically made available over a network by one or more providers. Some examples of services include, but are not limited to, a search service, a messaging service to send/receive messages, a network printing service, and a social networking service. Content may include various combinations of text, video, ads, audio, multi-media streams, animations, images, webpages, web applications, device applications, and the like.

Figure 2:
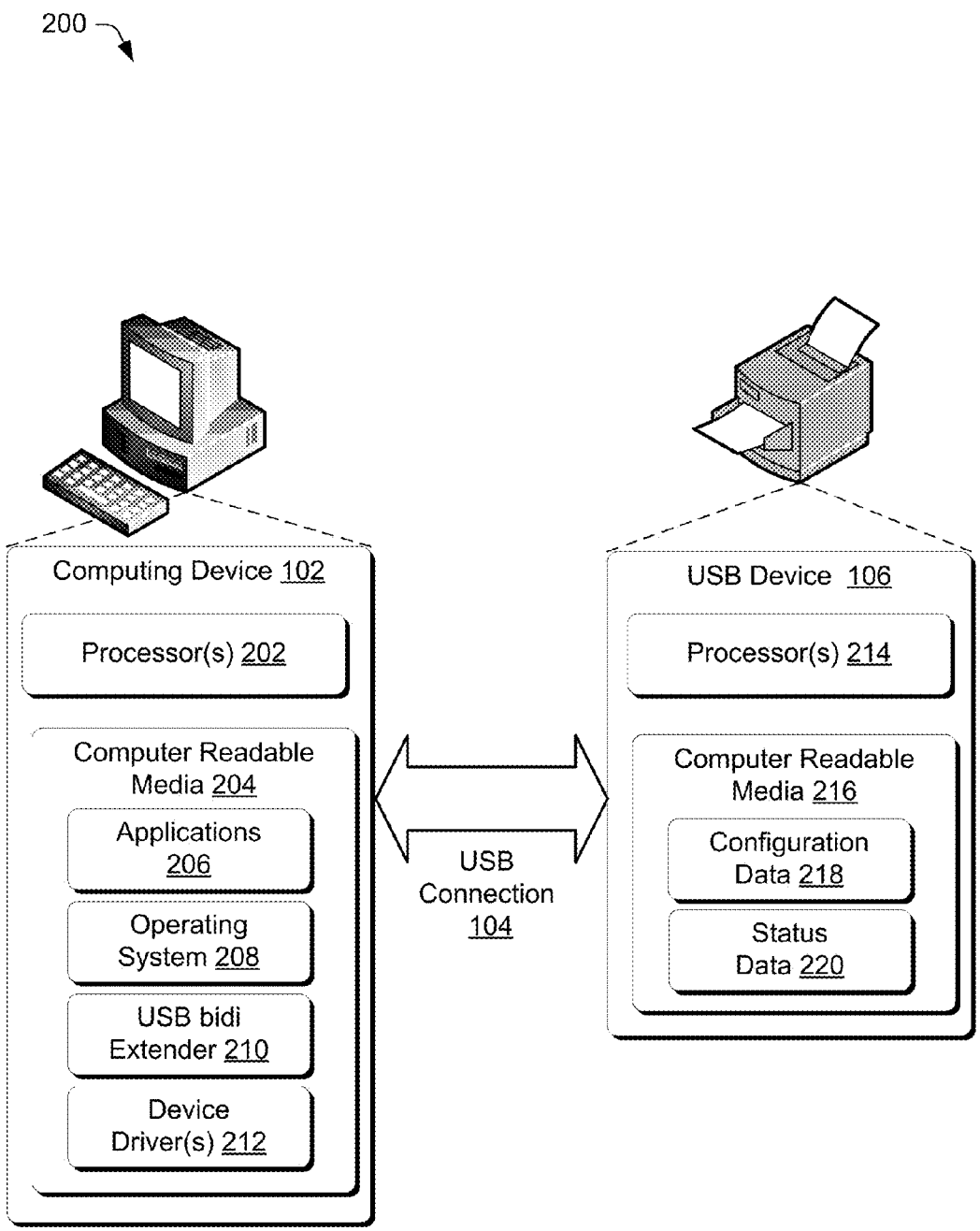
FIG. 2 is an illustration of a system in an example implementation showing aspects of FIG. 1 in greater detail.

To further illustrate the example operating environment, consider now FIG. 2 which depicts aspects of the example computing device 102 and an example USB device 106 of FIG. 1 in greater detail. In this example, the USB device 106 is illustrated as a USB printer, however, the techniques described herein are applicable to various different types of USB devices.

The computing device 102 of FIG. 2 includes one or more processors 202, one or more computer-readable media 204, and one or more applications 206, an operating system 208, a USB bidi extender 210, and one or more device drivers 212 that reside on the computer-readable media and which are executable by the processor(s). As discussed in greater detail below, the USB bidi extender 210 represents an interface that enables bidi communication between the applications 206 and devices corresponding to the device drivers 212. The device drivers 212 provide interfaces between the operating system 208 and hardware devices to process commands, format data, and otherwise enable interaction with the hardware devices in ways that the device is able to understand.

The USB device 106 is depicted as having one or more processors 214 and one or more computer-readable media 216. In addition, the USB device 106 includes configuration data 218 and status data 220 residing on the computer-readable media and which can be provided over the USB connection 104 to the computing device using USB bidi extension techniques described herein. Configuration data 218 describes various functional capabilities of the device. For a printer device this may include types of paper trays, printing functions, memory/processing capacity, and so forth. The status data 220 represents device specific status information. For a printer device this may include ink levels, print job status, paper tray status, printing error information, connection data, and so forth.

Computer-readable media as used herein can include, by way of example and not limitation, all forms of volatile and non-volatile memory and/or storage media that are typically associated with a computing device. Such media can include read only memory (ROM), random access memory (RAM), flash memory, hard disk, removable media and the like. One such configuration of a computer-readable media is signal bearing "communication media" that is configured to transmit computer-readable instructions (e.g., as a carrier wave) to the hardware of the computing device, such as via a network. The computer-readable media may also be configured as "computer-readable storage media" that excludes signals per se. Thus, computer-readable media includes both "computer-readable storage media" and "communication media" further examples of which can be found in the discussion of the example computing system of FIG. 8.

In operation, as will be described in detail below, the computing device 102 through the USB bidi extender 210 implements an extension schema to enable bidi communication with the USB devices 106. To do so, the computing device 102 may expose the USB bidi extender 210 that represents functionality to configure devices for bidi communications, handle requests from applications, and provide the applications with requested data from USB connected devices using techniques described herein. Although depicted separately, the USB bidi extender 210 may be provided as an integrated component of the operating system 208. For example, when implemented to handle bidi communication for USB printers, the USB bidi extender 210 may be provided as a component of a print subsystem.

Having described an example operating environment, consider now a discussion of example USB bidi extension techniques in accordance with one or more embodiments.

Example USB Bidi Extension Techniques

This section discusses details regarding example USB bidi extension techniques that may implemented by way of a suitably configured device, such as the example computing devices of FIGS. 1 and 2. In the discussion that follows, an example printer implementation is discussed in relation to FIG. 3. Following this, some example procedures for USB bidi extension are discussed in relation to FIGS. 4 to 7.

Example Printing Environment

Figure 3:
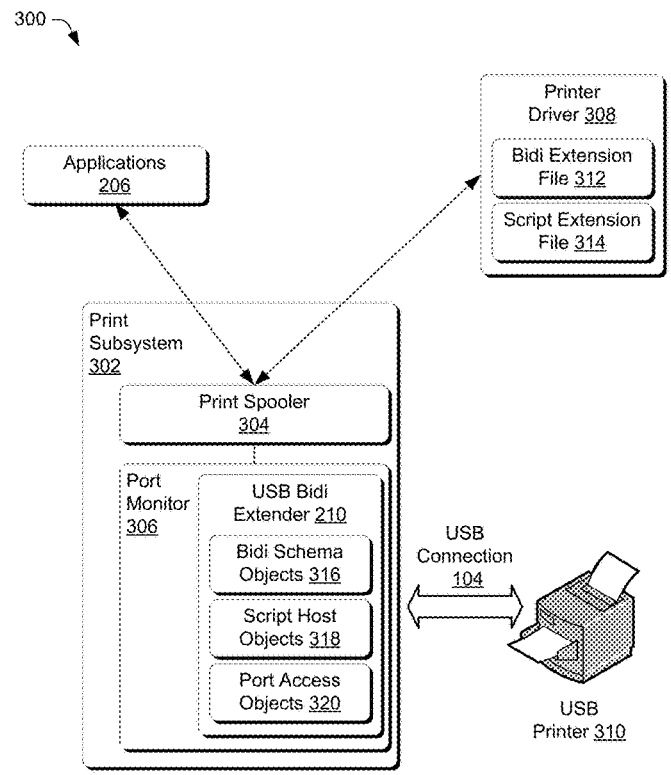
FIG. 3 illustrates a printing environment in accordance with one or more embodiments.

Consider FIG. 3 which illustrates an example printing environment 300 that enables bidi communication in accordance with one or more embodiments. Here, the example printing environment 300 includes a print subsystem 302 that may be provided as part of the operating system of a computing device. The print subsystem 302 further includes a print spooler 304 used to manage and queue print jobs from applications 206 and a port monitor 306. In addition, a printer driver 308 and a corresponding USB printer 310 connected to the print subsystem 302 by way of a USB connection 104 are depicted. Other suitable send/receive protocols and technologies may also be used to connect other kinds of devices for which bidi extension techniques may be implemented in substantially the same manner as for the USB device/connections examples described herein.

The port monitor 306 is configured to communicate with a device connected to a port. The port monitor 306 also operates to manage multiple ports including creating the ports, opening/closing of ports, assigning ports, and so forth. A port refers to a logical name that represents a connection to a particular device such as a network address (e.g., TCP/IP address) or, in this example, the USB connection 104 to the USB printer 310. Generally, data that passes through the port monitor 306 is provided in a form that may be understood by the destination device. In this example, a USB bidi extender 210 is provided as a component of the port monitor 306. The USB bidi extender 210 may also be provided as a component of the print subsystem 302 or operating system 208, or even as a standalone component.

The USB bidi extender 210 operates to configure the USB printer 310 for bidi communication and provides an interface for applications to access, use, and/or update data for the printer. The USB bidi extender 210 may do so in accordance with a bidi extension schema that establishes a hierarchy of device attributes (e.g., values/actions/queries) that may be passed between and/or employed by a USB device 106 and a computing device 102. The bidi extension schema defines the different attributes as well as extension files and request/response formats used to implement bidi communication.

In one approach, the USB bidi extender 210 is configured to detect and interpret various extension files that may be included within device drivers 212. When a hardware developer includes the extension files in the driver for a device, the USB bidi extender 210 knows to set-up the device for bidi communication over USB. Generally speaking, the extension files are configured to provide a list of supported bidi attributes (e.g., values/actions/queries), device configuration and capability information, and information describing how to make calls into a corresponding device to access status and configuration data through the attributes.

Accordingly, to take advantage of the bidi communication functionality provided by the USB bidi extender 210, a developer may incorporate one or more extension files defined by the schema as part of a device driver. Using formats defined by the schema, the developer creates compatible extension files that are used by the USB bidi extender 210 to set-up a corresponding device.

Extension files employed to enable USB bidi extension techniques may be configured in any suitable way. To simplify development, the USB bidi extender 210 may be configured to support extension files written using script-based programming languages. Examples of suitable scripting languages that can be used to implement extension files include, but are not limited to, JavaScript, European Computer Manufacturer's Association (ECMA) Script, Extensible Markup Language (XML) or other markup language script, and Asynchronous JavaScript and XML (AJAX). Using scripting languages instead of binary code allows developers to quickly and cheaply create USB device drivers that are compatible with bidi communication. In addition, the script-based extension files provide a processor-architecture independent way to access and define configuration/status data. Thus, development of custom binary code and independent binaries for different platforms may be avoided.

By way of example, the printer driver 308 of FIG. 3 is illustrated as including a bidi extension file 312 and a script extension file 314. In this example, the bidi extension file 312 represents a list describing the types of attributes that are supported by the corresponding printer. In some embodiments, the bidi extension file 312 is be configured as an XML file that encodes a list of supported attributes. The script extension file 314 represents a script-based file configured to describe various functionality and capabilities of a device and to define entry points used to call into the device. The entry points may include functions that can be executed to obtain appropriate data from a device. In one particular example, the script extension file 314 is implemented using JavaScript.

The USB bidi extender 210 can detect and use the bidi extension file 312 and script extension file 314 to initialize bidi communication for the USB printer 310. In general, initialization of bidi communication for a USB device involves creating a table or database of attributes that can be queried (e.g., supported attributes) and loading script from the extension files that can be executed via the USB bidi extender 210 to obtain current values for the attributes. In the example of FIG. 3, the USB bidi extender 210 includes or otherwise makes use of bidi schema objects 316 that represent a table of attributes created using the bidi extension file 312. A table for the USB printer 310 may be constructed for example by parsing an XML attribute list encoded in the bidi extension file 312. In addition, the USB bidi extender 210 includes or otherwise makes use of script host objects 318 that represent host objects to which the script extension file 314 can be loaded for execution by the USB bidi extender 210. Further, the USB bidi extender 210 may create port access objects 320 to facilitate communication with a device via an appropriate port. Generally, the port access objects 320 are created on demand and provide an interface between the port monitor 306 and script-based code employed by the USB bidi extender 210. Additional details regarding operation of a USB bidi extender 210 and other aspects of techniques for USB bidi extension are discussed in relation to the following example procedures.

Example Procedures

Procedures are now described for USB bidi extension that may be implemented using the previously described systems and devices. The procedures are shown as sets of blocks that are not necessarily limited to the particular order shown. The procedures can be performed in connection with any suitable hardware, software, firmware, or combination thereof. In at least some embodiments, the procedures can be performed by a suitably-configured computing device, such as the ones described above. In addition or alternatively, the procedures may be implemented through an operating system interface, such as the USB bidi extender 210 described herein.

Figure 4:
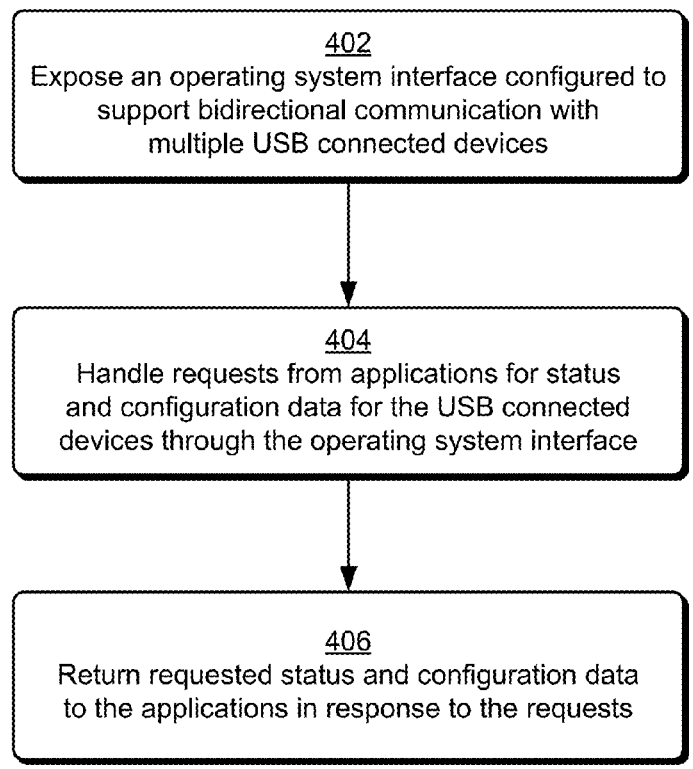
FIG. 4 is a flow diagram that describes an example procedure to enable bidi communication for USB devices in accordance with one or more embodiments.

FIG. 4 is a flow diagram that describes an example procedure 400 to provide bidi communication with USB devices in accordance with one or more embodiments. An operating system interface configured to support bidirectional communication with multiple USB connected devices is exposed (block 402). For example, a USB bidi extender 210 may be exposed by an operating system 208 on a computing device 102. The USB bidi extender 210 may be provided as an integrated component of the operating system 208. In one example, the USB bidi extender 210 is implemented as one or more application programming interfaces (APIs) provided by a port monitor 306. The USB bidi extender 210 provides a common interface that can handle bidi communication for devices from multiple IHVs, such as printers made by different manufacturers.

Requests from applications for status and configuration data for the USB connected devices are handled through the operating system interface (block 404) and requested status and configuration data is returned to the applications in response to the requests (block 406). For instance, the USB bidi extender 210 can receive and process requests from applications 206. The USB bidi extender 210 can format and submit queries to USB connected devices on behalf of the applications 206. Data obtained in response to the queries may be translated by the USB bidi extender 210 into an appropriate format for the applications 206, and returned back to the applications 206. In this manner, values for different supported bidi attributes can be manipulated through a suitably configured USB bidi extender 210 that operates to set-up bidi communications with USB devices.

Figure 5:
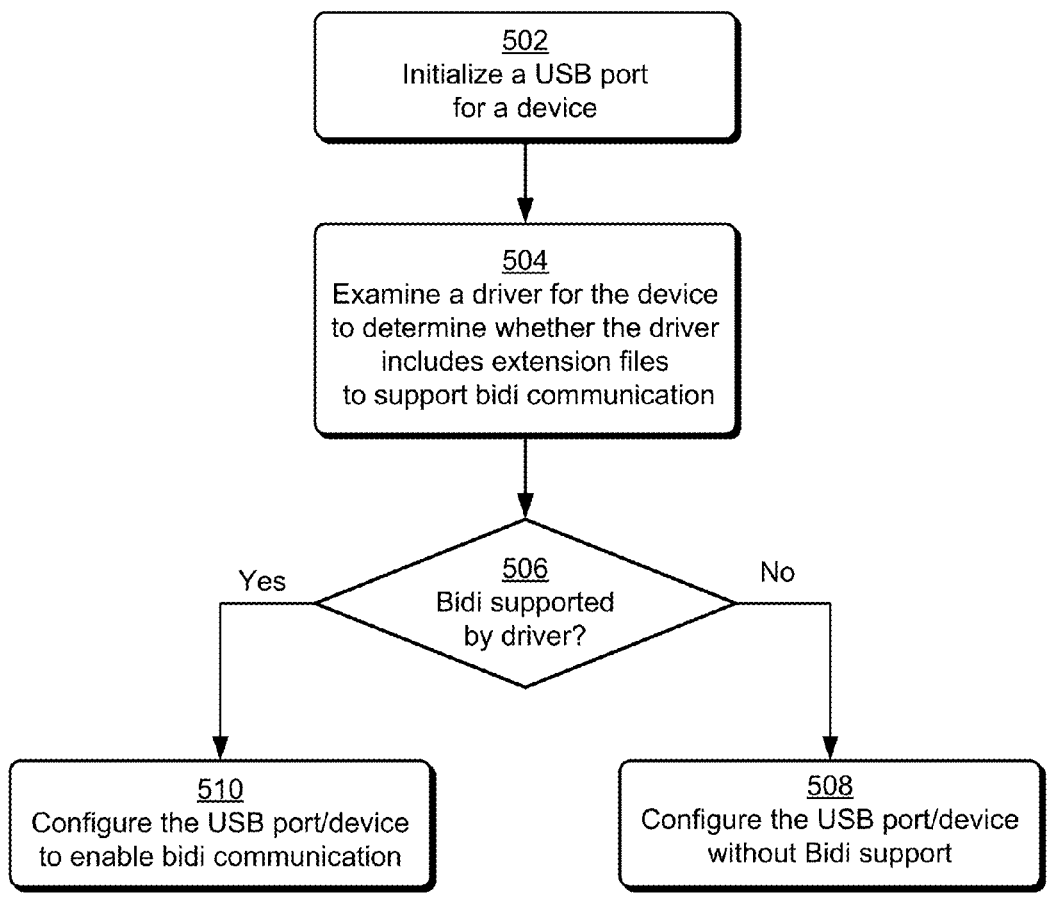
FIG. 5 is a flow diagram that describes an example procedure to initialize a USB device in accordance with one or more embodiments.

FIG. 5 is a flow diagram that describes an example procedure 500 to initialize a device for bidi communication in accordance with one or more embodiments. A USB port is initialized for a device (block 502). For example, a port monitor 306 configured to manage USB ports for multiple devices may open and assign ports to the devices. In at least some embodiments, the port monitor 306 may be designed to handle printers from different hardware manufacturers and may include a USB bidi extender 210 to facilitate bidi communication with the printers.

A driver for the device is examined to determine whether the driver includes extension files to support bidi communication (block 504) and based on the examination a decision is made as to whether the driver supports bidi (block 506). For example, the USB bidi extender 210 is operable to detect and process various extension files in a driver. Inclusion of appropriate extension files, such as the example bidi extension file 312 and/or script extension file 314, is indicative of support for bidi communication.

If bidi is not supported, then the USB bidi extender 210 and/or port monitor 306 may configure the USB port without support for bidi (block 508). In this case, the corresponding device will be unable to provide status and configuration data through the USB bidi framework described herein.

On the other hand, if bidi is supported, then the USB bidi extender 210 and/or port monitor 306 may configure the USB port to enable bidi communication (block 510). This occurs using the extension files that are detected within the driver to set-up the port assigned to the device for bidi communication. The corresponding device will then be able to provide status and configuration data through the USB bidi framework.

In one approach, the USB bidi extender 210 creates script-based objects representing the port/device to implement bidi communication for the device. In general, the script-based objects operate as an interface to handle corresponding script-based requests, communication, and data for bidi interaction between a computing device 102 and a USB device 106. Moreover, the objects are used to execute script and act as an intermediary between applications, the operating system, and USB devices. This may involve translating commands and data back and forth between script-based formats, native operating system formats, and formats understandable by different applications and devices. As mentioned, the USB bidi framework may employ JavaScript or other suitable scripting languages to initialize USB ports and corresponding devices for bidi communication. Some example details regarding operations that may be employed to configure a port/device per block 510 may be found in the following discussion of FIG. 6.

Figure 6:
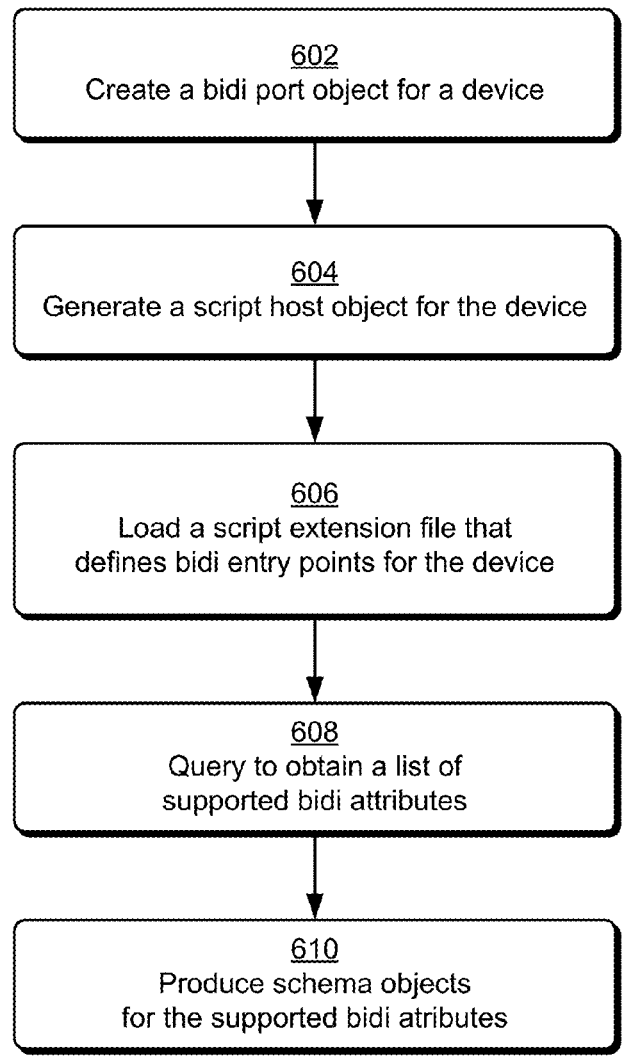
FIG. 6 is a flow diagram that describes an example procedure to configure a USB device for bidi communication in accordance with one or more embodiments.

In particular, FIG. 6 depicts a flow diagram that describes a procedure 600 showing example operations to configure a port for bidi communication in accordance with one or more embodiments. In at least some embodiments, the example procedure 600 is performed by a USB bidi extender 210 as described herein. To do so, the bidi extender 210 may reference and make use of XML and/or JavaScript extension files that are incorporated with a driver for a compatible USB device. A bidi port object is created for a device (block 602). For instance, a port monitor 306 may be configured to generate a bidi port object for each port/device combination managed by the port monitor 306.

For example, the USB bidi extender 210 can search a driver for a device to discover extension files as previously discussed. If one or more extension files are present, the device supports USB bidi communications and the USB bidi extender 210 creates a corresponding bidi port object for the device. The bidi port object is configured to manage polling of schema values for ports/devices that support queries for the values. The bidi port object can contain a list of extended schema values supported by the device as defined in a bidi extension file 312 and a link to a script extension file 314 having script executable to poll for the schema values. Thus, the bidi port object acts as an abstraction of the port that applications 206 and other entities can invoke/interact with to gain access to the corresponding port/device.

A script host object for the device is created (block 604) and a script extension file is loaded that describes bidi entry points for the device (block 606). For instance, the bidi port object may create a script host object 318 for the particular port/device. More generally, a different script host object 318 is created for each port/device combination. The script host object 318 provides an execution environment for corresponding script. Thus, a script extension file 314 may be loaded from the device driver to the script host object 318 where it is "hosted". When invoked, the JavaScript (or other script) loaded to the script host object 318 is configured to handle processing to call appropriate entry points (e.g., functions, APIs, executable code) to get, set, or otherwise manipulate particular schema values.

A query is made to obtain a list of supported bidi attributes (block 608) and schema objects are produced for the supported bidi attributes (block 610). For instance, a bidi extension file 312 contained in a driver may be processed in any suitable way to obtain the list of supported bidi attributes including supported schema values, actions, and queries. The bidi attributes represent different configuration and status data for a device that may be obtained and/or manipulated using the techniques discussed herein as well as actions/queries that can be performed on the configuration and status data. In one approach, JavaScript loaded into the script host object 318 operates to call an appropriate function (or other suitable entry point) to get a list of bidi attributes supported by a device as defined in the bidi extension file 312. In some cases, an XML based list is returned though interaction with the bidi extension file 312, which can be used to construct an array of schema objects.

The USB bidi extender 210 can then process through the XML based list to create schema objects for each supported attribute. The result is a table or database of schema objects representing bidi attributes supported by a device. Pre-processing to create the table or database in this manner may be employed to avoid on-demand processing for each request. Additionally, a cached list of supported attributes enables the USB bidi extender 210 and/or applications 206 to quickly discover the supported attributes. The schema objects also provide parameters used to set, obtain, cache or otherwise manipulate values for the configuration and status data.

At this point, the bidi port object created per block 602 is configured to support bidi schema actions/queries to manipulate the configuration and status data for a device, including getting and/or setting of schema values through the created schema objects. Applications 206 can request such data through a USB bidi extender 210 configured to handle bidi requests for USB devices as previously described. Example techniques to access and make use of the example USB bidi extender 210 and schema objects just described can be found in relation to the following example procedure.

Figure 7:
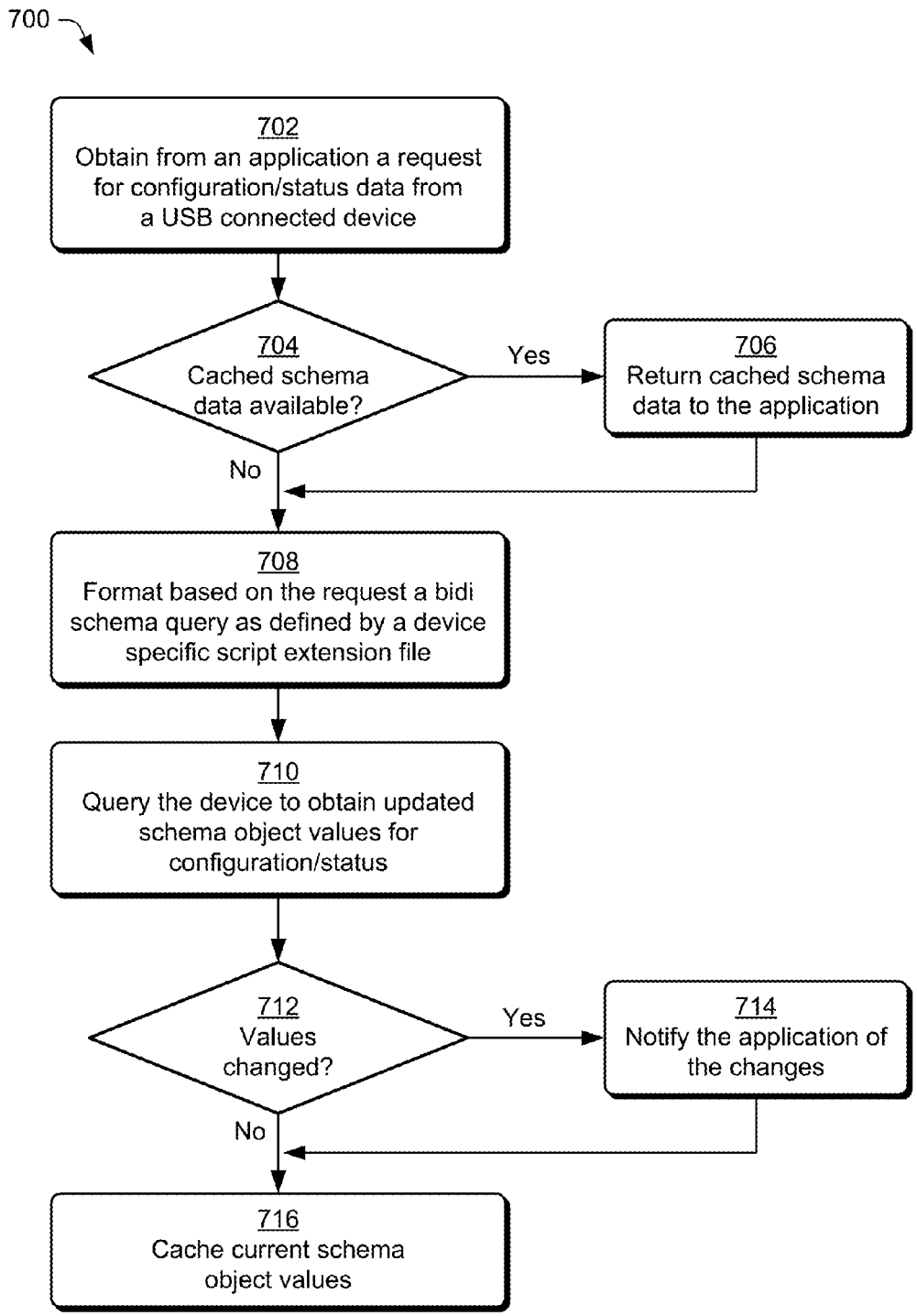
FIG. 7 is a flow diagram that describes an example procedure to query a device for configuration and status data in accordance with one or more embodiments.

In particular, FIG. 7 depicts a flow diagram that describes a procedure 700 showing example operations for bidi communications with a USB connected device. A request is obtained from an application for configuration/status data from a USB connected device (block 702). For example, an application 206 may call into the USB bidi extender 210 to initiate processing to obtain values for selected schema objects. In at least some embodiments, the call is configured as an API call made to an API exposed by the USB bidi extender 210. Additionally or alternatively, the USB bidi extender 210 may be configured to periodically poll connected devices to obtain updates to configuration/status data. The USB bidi extender 210 may then automatically provide notifications of the polled data back to applications that register to receive updates for a particular device. The polling and notifications can occur without initiation by an application. Thus, updates to configuration/status data can be initiated in response to explicit requests and/or through periodic polling conducted automatically by the USB bidi extender 210.

In response to a request and/or when configuration/status data is otherwise to be provided to an application, a determination is made regarding whether cached schema data is available (block 704). If data is cached, the cached schema data is returned to the application (block 706). Here, the USB bidi extender 210 first checks to see if current values for requested data are available. For instance, values may have been recently cached in connection with another request or based on polling by the USB bidi extender 210. If current values are available, the USB bidi extender 210 may return the values right away so that the application 206 does not have to wait for processing to update the data. The USB bidi extender 210 may then proceed to update the configuration/status data to ensure that values provided to application have not changed.

Thus, as shown in FIG. 7, the framework may proceed to update cached data or obtain new data if data was unavailable per block 704. To do so, a bidi schema query is formatted based on the request as defined by a device specific script extension file (block 708). For example, the table or database of schema objects (e.g., XML list of supported attributes) can be used to determine which values are to be updated for a given request or polling operation. The script host object 318 includes script that can be invoked to call into the appropriate functions or other suitable entry points of a device to obtain current values for selected bidi schema objects.

Accordingly, The USB bidi extender 210 can operate to call into script that is loaded to a script host object 318 with selected bidi schema objects 318 and also with a port access object 320 used to communicate with the device in a native way. In other words, the port access object 320 may translate between the script based commands/operations implemented by the script host object and communication formats used by the port monitor 306, operating system 208, and/or USB devices 106. In this way, the device can be queried to obtain updated schema object values for configuration/status data (block 710).

Using updated values that are returned in response to the query, a determination is made as to any changes in the schema object values (block 712). If values have changed, the application may be notified of the changes (block 714). This involves returning the updated values back to the requesting application. Otherwise, the current schema object values are cached (block 716) and may be used to handle subsequent requests.

For example, a combination of requests on demand by applications and/or periodic polling by the USB bidi extender 210 can be employed to obtain updated configuration/status data for USB devices 106 over a USB connection 104. In at least some embodiments, cached data, if available, can be returned to a requester first to reduce dwell time. Then, the USB bidi extension framework can update data in the background and provide notifications of any changes to the application. Notifications may also be provided to applications 206 that register for configuration/status notifications for a particular USB device 106 whenever corresponding data is polled or updated. Additionally, any changes to the data determined through an update can be cached so that the most current data is available quickly from the USB bidi extension framework. The data is cached by updating values associated with corresponding bidi schema objects 316 to reflect the most current values.

Having described some example details regarding USB bidi extension techniques, consider now a discussion of an example system to implement the described techniques in accordance with one or more embodiments.

Example System

Figure 8:
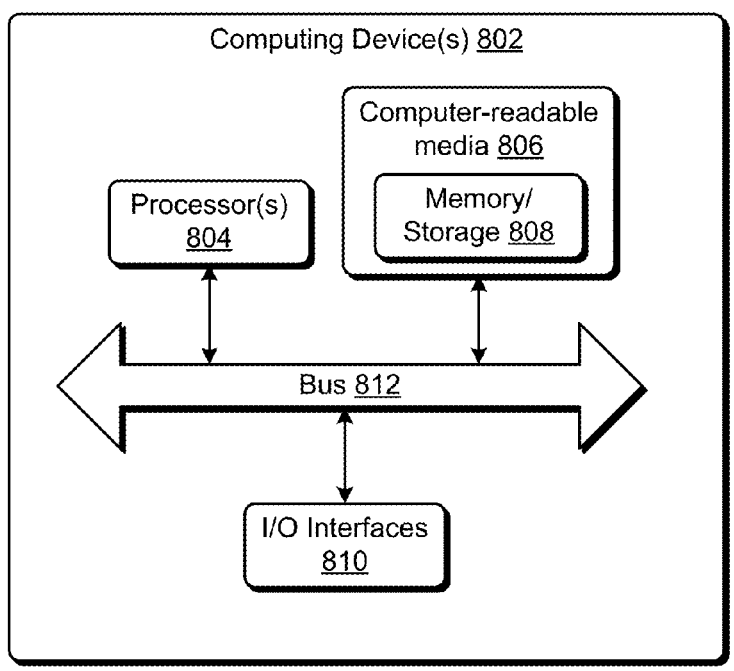
FIG. 8 illustrates an example computing system that can be utilized to implement various embodiments described herein.

FIG. 8 illustrates an example system generally at 800 that includes an example computing device 802 that is representative of one or more such computing systems and/or devices that may implement the various embodiments described above. The computing device 802 may be, for example, a server of a service provider 110, a device associated with the computing device 102 (e.g., a client device), a system on-chip, and/or any other suitable computing device or computing system.

The example computing device 802 includes one or more processors 804 or processing units, one or more computer-readable media 806 which may include one or more memory and/or storage components 808, one or more input/output (I/O) interfaces 810 for input/output (I/O) devices, and a bus 812 that allows the various components and devices to communicate one to another. Computer-readable media 806 and/or one or more I/O devices may be included as part of, or alternatively may be coupled to, the computing device 802. The bus 812 represents one or more of several types of bus structures, including a memory bus or memory controller, a peripheral bus, an accelerated graphics port, and a processor or local bus using any of a variety of bus architectures. The bus 812 may include wired and/or wireless buses.

The one or more processors 804 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 808 represents memory/storage capacity associated with one or more computer-readable media. The memory/storage component 808 may include volatile media (such as random access memory (RAM)) and/or nonvolatile media (such as read only memory (ROM), Flash memory, optical disks, magnetic disks, and so forth). The memory/storage component 808 may include fixed media (e.g., RAM, ROM, a fixed hard drive, etc.) as well as removable media (e.g., a Flash memory drive, a removable hard drive, an optical disk, and so forth).

Input/output interface(s) 810 allow a user to enter commands and information to computing device 802, and also allow information to be presented to the user and/or other components or devices using various input/output devices. Examples of input devices include a keyboard, a touchscreen display, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the USB bidi extender 210, device drivers 212, port monitor 306, operating system 208, applications 206, and other program modules, may be implemented as one or more instructions and/or logic embodied on some form of computer-readable media.

Accordingly, particular modules, functionality, components, and techniques described herein may be implemented in software, hardware, firmware and/or combinations thereof. The computing device 802 may be configured to implement particular instructions and/or functions corresponding to the software and/or hardware modules implemented on computer-readable media. The instructions and/or functions may be executable/operable by one or more articles of manufacture (for example, one or more computing devices 802 and/or processors 804) to implement techniques for USB bidi extension, as well as other techniques. Such techniques include, but are not limited to, the example procedures described herein. Thus, computer-readable media may be configured to store or otherwise provide instructions that, when executed by one or more devices described herein, cause various techniques for USB bidi extension.

Conclusion

In accordance with the foregoing detailed description, an interface may be provided to enable bidirectional communication with USB connected devices. The interface may be configured as a USB bidi extender that is incorporated as an operating system component and designed to support bidi communications for USB devices. The USB bidi extender supports and employs extension files defined using script-based programming to set-up USB devices for bidi communications. Applications may then invoke the USB bidi extender to request data for a device, set values for device specific data, and/or register to receive change notifications regarding the data.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A method comprising:
    exposing an operating system interface configured to support bidirectional (bidi) communications with multiple universal serial bus (USB) connected devices, the operating system interface configured as a component of a common port monitor for the USB connected devices that enables bidi interaction with the multiple USB connected devices using script-based objects created to represent port/device combinations for each of the multiple USB connected devices;
    generating the script based objects to represent each of the USB connected devices to enable bidi interaction for the USB connected devices commonly through the operating system interface;
    handling requests from applications for status and configuration data for the USB connected devices through the operating system interface using the script based objects; and
    returning requested status and configuration data from the USB connected devices to the applications in response to the requests.

2. The method of claim 1, wherein the script-based objects created to represent port/device combinations include bidi schema objects, script host objects, and port access objects corresponding to each of the USB connected devices.

3. The method of claim 1, wherein the operating system interface is configured to handle bidi communications for devices from multiple different independent hardware vendors (IHVs).

4. The method of claim 1, wherein the operating system interface comprises a component of a print subsystem that operates to handle printing to USB connected printers.

5. The method of claim 1, wherein the operating system interface implements a script-based extension schema.

6. The method of claim 1, wherein the operating system interface is further configured to:
    detect script-based extension files included in device drivers corresponding to the multiple USB connected devices in accordance with a script-based extension schema; and
    configure the multiple USB connected devices for bidi communications based on the script-based extension files that are detected.

7. The method of claim 6, wherein the script-based extension files for each particular device describe bidi values, actions, and queries for status and configuration data supported by the particular device and entry points used to access the status and configuration data from the particular device.

8. The method of claim 6, wherein configuration of the multiple USB connected devices for bidi communications comprises:
    processing the script-based extension files to create a table of bidi attributes supported by the USB connected devices; and loading script from the script-based extension files that is callable via the operating system interface to obtain current values for the supported bidi attributes.

9. The method of claim 1, wherein handling requests from the applications for status and configuration data for the USB connected devices comprises:
formatting and submitting queries to the USB connected devices on behalf of the applications.

10. The method of claim 1, wherein handling requests from the applications for status and configuration data for a particular USB connected device comprises:
loading a script-based extension file from a driver corresponding to the particular USB connected device, the script-based extension file executable to query entry points of the particular USB connected device to update values of bidi schema objects representing bidi attributes supported by the particular USB connected device.

11. One or more computer readable storage media storing instructions that, when executed by one or more components of a computing device, implement an operating system interface configured as a common port monitor to perform operations to support bidirectional (bidi) communications with multiple universal serial bus (USB) connected devices from multiple different independent hardware vendors (IHVs), the operations comprising:
creating script-based objects to represent port/device combinations for each of the multiple USB connected devices with respect to the operating system interface;
handling requests from applications for status and configuration data for the USB connected devices through the operating system interface including formatting and submitting queries to the USB connected devices on behalf of the applications; and
returning requested status and configuration data from the USB connected devices to the applications in response to the requests.

12. One or more computer readable storage media of claim 11, wherein the operating system interface is further configured to perform operations including:
detecting script-based extension files included in device drivers corresponding to the multiple USB connected devices in accordance with a script-based extension schema; and
configuring the multiple USB connected devices for bidi communications based on the script-based extension files that are detected.

13. One or more computer readable storage media of claim 12, wherein the script-based extension files for each particular device describe bidi values, actions, and queries for status and configuration data supported by the particular device and entry points used to access the status and configuration data from the particular device.

14. One or more computer readable storage media of claim 12, wherein configuring the multiple USB connected devices for bidi communications comprises:
processing the script-based extension files to create a table of bidi attributes supported by the USB connected devices; and
loading script from the script-based extension files that is callable via the operating system interface to obtain current values for the supported bidi attributes.

15. One or more computer readable storage media of claim 11, wherein handling requests from the applications for status and configuration data for a particular USB connected device further comprises loading an extension file from a driver corresponding to the particular USB connected device, the extension file executable to query entry points of the particular USB connected device to update values of bidi schema objects representing bidi attributes supported by the particular USB connected device.

16. A computing system comprising:
processing hardware;
one or more computer readable storage media storing instructions that, when executed by the processing hardware, cause the computing system to perform operations including:
exposing an interface to handle requests from applications for status and configuration data for universal serial bus (USB) connected devices communicatively connected with the computing system over USB connections;
obtaining requested status and configuration data for the USB connected devices on behalf of the applications in response to the requests and in accordance with a script-based extension schema for bidi communications with the USB connected devices over the USB connections including determining if cached data is available for each of the USB connected devices and querying USB connected devices for which cached data is unavailable over the USB connections to obtain corresponding status and configuration data; and
returning the status and configuration data that is obtained for use by the applications including returning the cached data for USB connected devices when available; and returning the status and configuration data obtained by querying the USB connected devices for which cached data is unavailable.

17. The computing system of claim 16, wherein the interface is configured to support bidirectional (bidi) communications with multiple universal serial bus (USB) connected devices of the computing system.

18. The computing system of claim 16, wherein the interface is an application programming interface (API) provided as a component of a USB port monitor for the computing system configured to manage ports for the multiple USB connected devices.

19. The computing system of claim 16, wherein the USB connected devices include one or more USB printers, the interface being configured to support bidirectional (bidi) communications for at least USB printers.

20. The computing system of claim 16, wherein: the interface is configured as a component of a common port monitor for the USB connected devices that enables the common port monitor to facilitate bidi interaction with the USB connected devices using script-based objects created to represent port/device combinations for each of the USB connected devices.

* * * * *